(12) United States Patent
McClamroch et al.

(10) Patent No.: US 7,181,454 B1
(45) Date of Patent: Feb. 20, 2007

(54) ASSET LOCATOR

(75) Inventors: Kenneth McClamroch, Apex, NC (US); Avi Yaeli, Haifa (IL); Gobi Zodik, Nesher (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/473,554

(22) Filed: Dec. 29, 1999

(51) Int. Cl.
*G06F 17/00* (2006.01)
*G06F 7/00* (2006.01)
*G06F 9/44* (2006.01)

(52) U.S. Cl. ............... 707/10; 707/3; 717/8; 717/168
(58) Field of Classification Search .............. 707/10, 707/3, 5; 717/8, 168
See application file for complete search history.

(56) References Cited

U.S. PATENT DOCUMENTS

| | | | | |
|---|---|---|---|---|
| 4,642,767 A | | 2/1987 | Lerner | 364/406 |
| 4,931,928 A | * | 6/1990 | Greenfeld | 717/131 |
| 5,117,349 A | * | 5/1992 | Tirfing et al. | 707/3 |
| 5,339,424 A | * | 8/1994 | Fushimi | 717/146 |
| 5,673,315 A | | 9/1997 | Wolf | 380/4 |
| 5,691,980 A | | 11/1997 | Welles, II et al. | 370/316 |
| 5,752,244 A | * | 5/1998 | Rose et al. | 707/5 |
| 5,832,499 A | | 11/1998 | Gustman | 707/103 |
| 5,855,020 A | * | 12/1998 | Kirsch | 707/10 |
| 5,856,931 A | * | 1/1999 | McCasland | 702/182 |
| 5,875,430 A | | 2/1999 | Koether | 705/1 |
| 5,893,110 A | | 4/1999 | Weber et al. | 707/104 |
| 5,923,850 A | | 7/1999 | Barroux | 395/200.54 |
| 5,930,342 A | | 7/1999 | Mazzapica | 379/102.01 |
| 5,956,713 A | * | 9/1999 | Bamford et al. | 707/8 |
| 5,959,275 A | | 9/1999 | Hughes et al. | 235/375 |
| 5,963,958 A | * | 10/1999 | Cottrill | 707/104.1 |
| 6,016,557 A | * | 1/2000 | Kasprzyk et al. | 714/38 |
| 6,205,440 B1 | * | 3/2001 | Nusbickel | 707/2 |
| 6,233,575 B1 | * | 5/2001 | Agrawal et al. | 707/6 |
| 6,256,773 B1 | * | 7/2001 | Bowman-Amuah | 717/121 |
| 6,282,698 B1 | * | 8/2001 | Baker et al. | 717/118 |
| 6,311,327 B1 | * | 10/2001 | O'Brien | 717/114 |
| 6,321,205 B1 | * | 11/2001 | Eder | 705/7 |

(Continued)

OTHER PUBLICATIONS

Eltoft et al., "Keeping Text Attributes Separately from Edited Text," IBM Technical Disclosure Bulletin, vol. 37, No. 3, 577-578 (Mar. 1994).

Chaudhuri and Gravano, "Optimizing Queries over Multimedia Repositories," SIGMOD, Jun. 1996, pp. 91-102 (1996).

*Primary Examiner*—Safet Metjahic
*Assistant Examiner*—Cindy Nguyen
(74) *Attorney, Agent, or Firm*—Synnestvedt & Lechner LLP; Martin J. McKinley

(57) ABSTRACT

A method and system for locating assets is disclosed that provides the capability for the gathering of information about assets contained in data repositories and the capturing of the gathered information in a database which can be used for the conducting of subsequent searches. By integrating into the system a series of data analyzers that are specific to each type of data contained in the repositories (e.g., a Java analyzer, a C/C++ analyzer, a COBOL analyzer, an HTML analyzer, and/or an XML analyzer) the system can be used to search the repositories using conventional keyword-searching techniques, as well as by searching for particular attributes specific to a particular language, or by combining keyword-searching with attribute-specific searching.

12 Claims, 5 Drawing Sheets

U.S. PATENT DOCUMENTS

| | | | |
|---|---|---|---|
| 6,366,916 B1 * | 4/2002 | Baer et al. | 707/10 |
| 6,367,068 B1 * | 4/2002 | Vaidyanathan et al. | 717/143 |
| 6,401,085 B1 * | 6/2002 | Gershman et al. | 707/4 |
| 6,457,018 B1 * | 9/2002 | Rubin | 707/4 |
| 6,493,703 B1 * | 12/2002 | Knight et al. | 707/3 |
| 6,496,833 B1 * | 12/2002 | Goldberg et al. | 707/102 |
| 6,694,484 B1 * | 2/2004 | Mueller | 715/513 |
| 2002/0170048 A1 * | 11/2002 | Zgarba et al. | 717/168 |

* cited by examiner

US 7,181,454 B1

ASSET LOCATOR

FIELD OF THE INVENTION

This invention relates to computer system resource management systems and methods in general, and more specifically, to methods for indexing and locating assets, such as application programs which may be written in a variety of different programming languages, in a distributed or network environment.

BACKGROUND OF THE INVENTION

Computers are becoming more and more an aspect of everyday life. Children as young as two years old are now exposed to computers in a home environment and they are now commonplace in schools, businesses, factories, and virtually every aspect of life.

One of the most common uses of computers is to create, store, and index data for later retrieval. As a result of the burgeoning growth of computer usage, the number of data files available for searching has grown exponentially, leading to an "information overload" that can overwhelm a data searcher.

To help manage the access to these massive numbers of files, also known as "assets", a process called "data mining" has evolved. Data mining is defined in *Newton's Telecom Dictionary* (15$^{th}$ Edition, Miller Freeman Publishing, New York, N.Y.) as "[U]sing sophisticated data search capabilities that use statistical algorithms to discover patterns and correlations in data." In essence, computers are used to "crawl" through masses of data files, analyze the information contained in the files according to criteria input by the user, and output results to the user which the user can use to study the information further.

To support the explosive growth of computer usage, software development has become a key part of any company engaged in high-technology business. Large companies such as IBM and Microsoft may have many software development groups located at numerous locations throughout the world, with each group employing hundreds or thousands of employees.

As used herein, complete programs (e.g., Microsoft Word) developed by the programmers are referred to as "software assets" and the various subroutines used to produce the software asset (e.g., C++ subroutines and programs used to create Microsoft Word) are referred to as "code assets." These assets may number in the thousands or more for a single company and vary substantially in complexity, function, and size. For example, an asset may be a single program comprising hundreds of thousands of lines of computer code and designed to perform a multitude of tasks; at the other end of the spectrum, an asset may be a single subroutine comprising three lines of code.

With large numbers of employees focusing their work on the development of these assets, management becomes a critical task. With multiple groups within a company at different locations developing software for a variety of tasks, it is inevitable that duplication of effort will occur.

To avoid such duplication, it is desirable for all of the members of design groups, as well as all of the design groups within a company, to be able to share with each other the assets that they develop, and systems have been developed to assist in the management of such assets. In the software development field, the management, indexing, and retrieval of assets introduces an additional level of complexity not necessarily found in other asset management schemes. In particular, within a single group, assets may be developed in several different programming languages (e.g., Java, C/C++, COBOL, HTML, and/or XML) at the same time. Searching for code assets increases the complexity and difficulty of the search, since programmers typically want to search for language-specific constructs/semantics, such as inheritance relation, in object-oriented languages which cannot be captured using standard free-text searches. This makes it difficult for the users of the system to thoroughly search all of the assets.

Accordingly, it would be desirable to have an asset location system which offers the ability for free-text "search engine" style queries, attribute-specific queries, or a mixture of free-text queries and attribute-specific queries.

SUMMARY OF THE INVENTION

The present invention is a method and system for locating assets that provides the capability for the gathering of information about assets contained in data repositories and the capturing of the gathered information in a database which can be used for the conducting of subsequent searches. The information can be captured from a single data repository or from plural data repositories, e.g., all data repositories maintained by a particular enterprise in disparate locations, with the captured information being consolidated into a single database for access by multiple users.

The present invention has particular application in a software-development environment where the stored assets may number in the millions and may be written in diverse languages such as, for example, Java, C/C++, COBOL, HTML, and/or XML. By integrating into the system a series of data analyzers that are specific to each type of data contained in the repositories (e.g., a Java analyzer, a C/C++ analyzer, a COBOL analyzer, an HTML analyzer, and/or an XML analyzer) the system can be used to search the repositories using conventional keyword-searching techniques, as well as by searching for particular attributes specific to a particular language, or by combining keyword-searching with attribute-specific searching.

To achieve the foregoing, and in accordance with the purpose of the invention as broadly described herein, the present invention provided a computer-implemented method for indexing and locating assets stored on a storage device, comprising the steps of: performing a crawl process on the storage device to identify stored assets; identifying asset-specific parameters related to the stored assets; analyzing the stored assets based on the identified asset-specific parameters; extracting textual and semantic information from the stored assets; and storing and indexing the extracted textual and semantic information for retrieval. In a preferred embodiment the stored assets comprise code assets (software subroutines and other programming tools) and/or software assets (complete programs).

According to another aspect of the invention, the present invention provides an indexing and locating system for indexing and locating assets stored on a storage device, comprising: crawling means for reading the contents of the storage device to identify stored assets; analyzing means for identifying asset-specific parameters related to the stored assets, analyzing the stored assets based on the identified asset-specific parameters, and extracting textual and semantic information from the stored assets based on the analysis; and storing and indexing means for storing and indexing the extracted textual and semantic information for retrieval.

The present invention will now be described with reference to the following drawings, in which like reference numbers denote the same element throughout.

DETAILED DESCRIPTION OF THE PREFERRED EMBODIMENT

Figure 1:
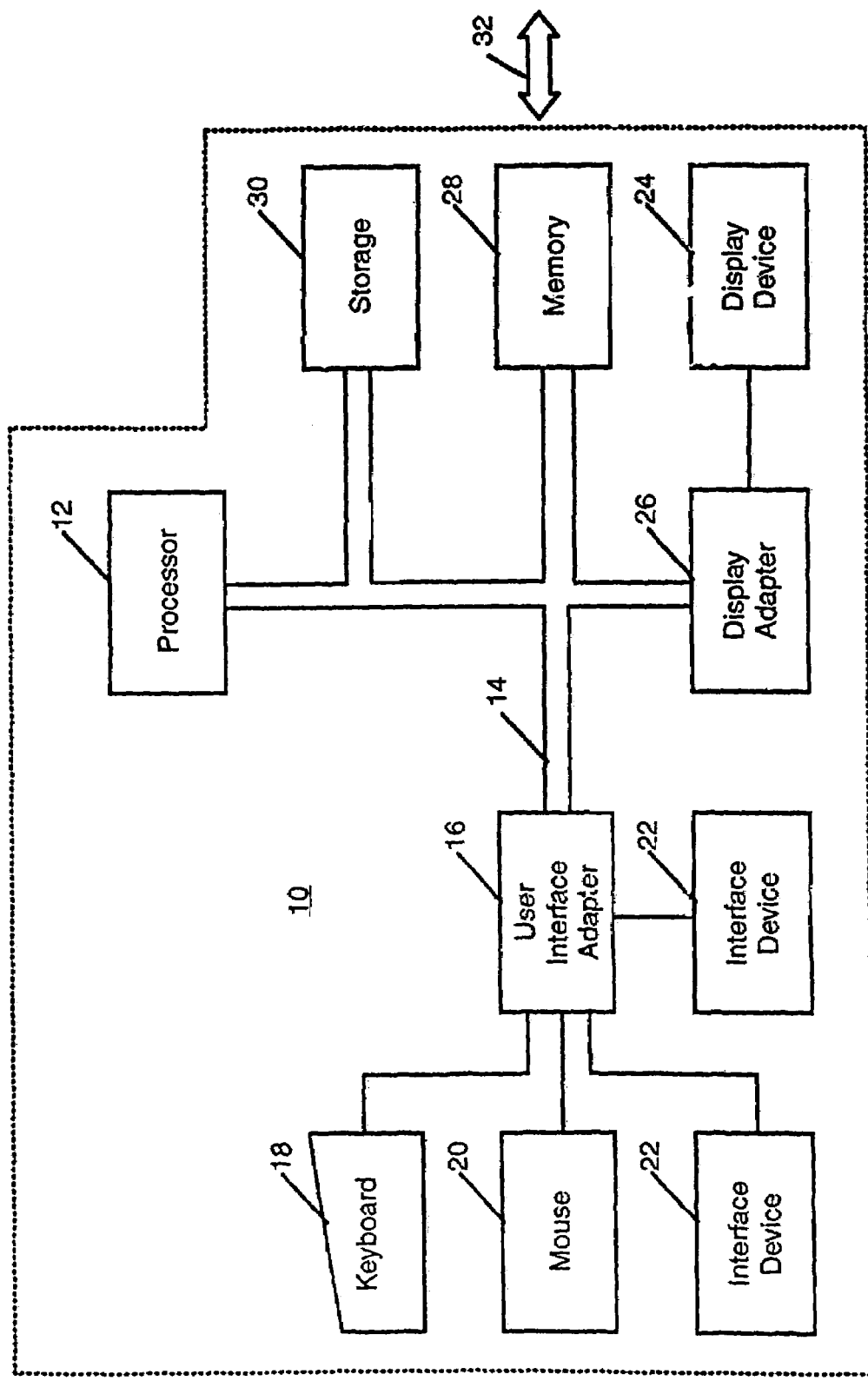
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
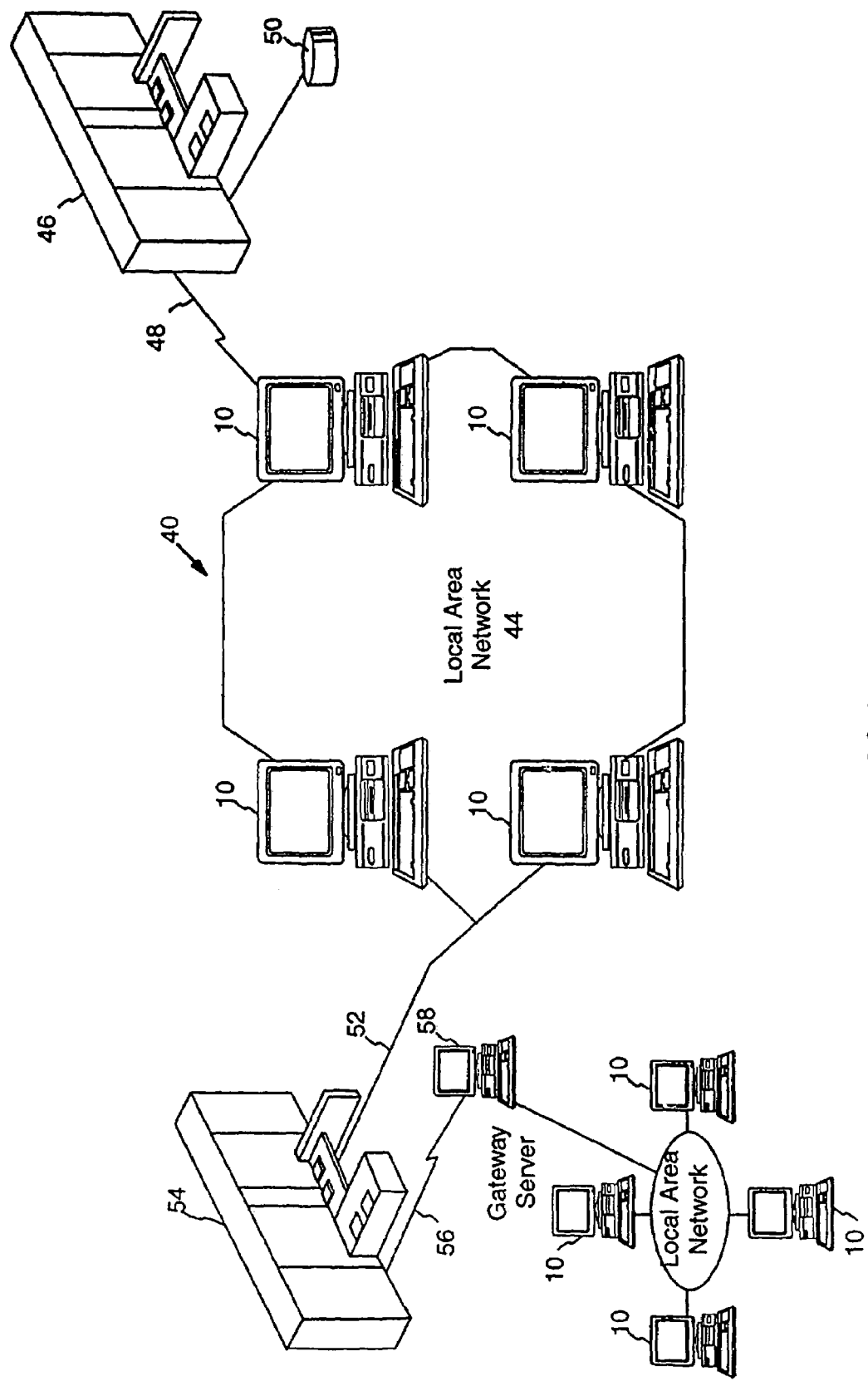
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIGS. 3 through 5

Figure 3:
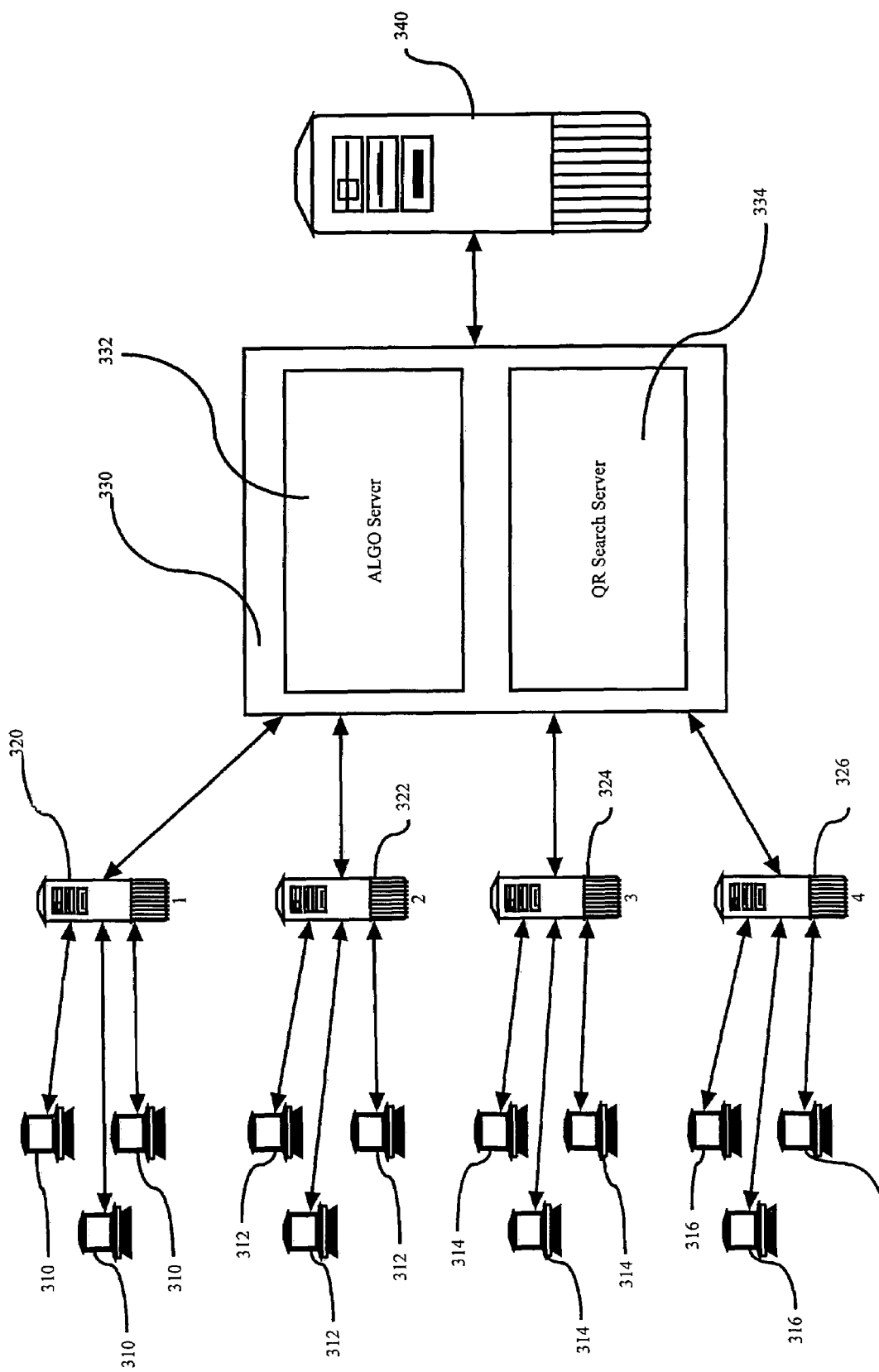
FIG. 3 is a block diagram illustrating the basic elements of a system in accordance with the present invention.

FIG. 3 is a block diagram illustrating the basic elements of a system 300 in accordance with an embodiment of the present invention. In this example, four software development teams (Team 1, Team 2, Team 3, and Team 4) representing four distinct business units within an organization independently develop software assets for their respective business units. Referring to FIG. 3, Team 1 controls a plurality of work stations 310 which are connected in a known manner to a Team 1 server 320. Likewise, Team 2 controls a plurality of work stations 312 connected to a Team 2 server 322; Team 3 controls a plurality of work stations 314 coupled to a Team 3 sever 324; and Team 4 controls a plurality of work stations 316 coupled to a Team 4 server 326. Among other duties, the Team servers 320, 322, 324, and 326 serve as repositories for the software assets developed by their respective teams.

A central server 330, comprising an Asset Locating and Gathering Operation (ALGO) server 332 and a Query and Result (QR) search server 334, is coupled to each of the Team servers 320, 322, 324, and 326 via network connection or other known connection method to allow each of the Team servers and, therefore, each of the work stations, access to and from the central server 330. In a preferred embodiment, QR server 334 is a Java servlet and ALGO server 332 is a stand-alone Java application. As described in more detail below with respect to FIGS. 4 and 5, the central server 330 performs information gathering/extraction, classification, indexing, and search functions to give the Teams easy and effective access to the assets developed on behalf of the entire organization.

Coupled to central server 330 is a Database and Index (DI) server 340. As with all of the connections between the elements of the system, DI server 340 is coupled to central server 330 via network connection or other known connection method which allows two-way data communication between the servers.

The general operation of the system is as follows. The members of each Team develop assets at their work stations and store the assets on their respective Team servers. The assets may be developed in different asset types (e.g., COBOL, Java, etc) from Team to Team or even within a Team itself. Thus, for example, Team 1 server 320 may contain assets written in Java and HTML, Team 2 server may contain assets written solely in COBOL, Team 3 server may contain assets written in C/C++ and XML, and Team 4 may contain assets written in Java, COBOL, XML, HTML, and C/C++.

ALGO server 332 performs a crawl on the Team servers in accordance with a user configuration to discover code assets. It then extracts textual and semantic information from the assets during an analysis step, described in more detail below. This crawl process can be performed manually (upon user command) or based on a predetermined schedule. In a preferred embodiment, a scheduler is included as part of ALGO server 332 to perform the crawling function at a predetermined time interval, for example, at a time when computer resources are otherwise idle. Regardless of which crawl method is utilized, the process is "smart" in that the ALGO server 332 only analyzes new or changed data as compared to the immediately preceding crawl. Thus, once the initial crawl is performed to populate the DI server 340 with asset information, subsequent crawls take significantly less time to complete.

ALGO server 332 also performs an analysis function, based upon the types of languages of the discovered assets. The analysis of the information is performed in a known manner using parsing techniques familiar to those of ordinary skill in the art. In the present example the ALGO server 332 includes a Java analyzer, a C/C++ analyzer, a COBOL analyzer, an HTML analyzer, and an XML analyzer. As described in more detail below, these analyzers extract the file path and last update time/date for each asset, construct a free-text attribute based on comments and other text in the asset file, and capture semantic information which differs based on each language type.

The format of the filepath and timestamp is the same for each source type, i.e., it is not language or analyzer specific. The structure of the filepath may, however, differ from one repository to another. For example, the file system filepath might be a fully-qualified file name (e.g., C:\JavaAssets\source.Java), whereas a software configuration management repository might have a different filepath (e.g., sourceRelease:sourceFamily:source.Java). To accommodate these differences, the present invention provides a set of crawlers, with each crawler programmed in a well-known manner to crawl a specific repository and capture the relevant metadata for the repository, including filepath and timestamp.

The free-text attribute consists of textual information for which a user may wish to search. This textual information is made up of comments found in the asset as well as the semantic information (which is language specific). This allows user to perform search-engine style queries across these assets. The words captured in this free-text attribute are indexed by an index server to allow free-text searches for quick retrieval of assets containing desired words. The format of the free-text attribute and the indexing of this information is the same for all language types. The capturing of this textual information will vary for each analyzer because comment conventions are different for each language type. The individual analyzers are programmed to capture the textual information for the appropriate language type, but the format of the resulting information written to the database is the same. This essentially standardizes the information being searched so that searching is made easier.

With regard to the semantic information, each analyzer is programmed to capture semantic information that represents the semantic of the language, specific to that asset type. For example, the Java analyzer is programmed to capture inheritance information, package information, which methods are defined for a Java class, which methods are invoked by a Java class, which data variables are defined, what Java packages are imported by this class, etc. All of this information is specific to Java assets and once captured allows users to perform very specific queries to accurately identified desired assets.

As an example, a user may wish to determine which assets extend the Java class "HashTable," a collection class provided by the Java language. This can quickly be determined using the present invention by issuing an attribute-specific query requesting all Java classes that inherit from the class HashTable. The results from this query will return only classes that meet this requirement. Note that issuing a free-text query for HashTable would return all classes that contain HashTable as a comment, usage, or inheritance, and not just those that inherit from the class HashTable.

Once the repository data is gathered, analyzed, and classified by the ALGO server 332, it is stored in the DI server 340 where it is accessible for use during a search process. DI server 340 includes a separate database table for each analyzer. Each table in the database contains attributes that represent all the textual and semantic information captured for that asset type. The analyzer captures the information from the source/asset and writes the semantic information to the appropriate attributes of the table. The result of the analysis is a single table for each asset containing a separate row in the table for each asset, with each row containing columns representing the semantic attribute information, stored as words separated by a single space (i.e., space delimited). For example, the "methods type" column of the Java table might contain, for an asset named "Partl.java", the following four methods: "setType getType updateFields printFields". The free-text attribute for each of the tables is the only attribute that is indexed by the index server described above.

When a Team member wishes to determine if there is already an asset which meets the needs of the particular project he/she is working on, a search can be entered on the Team member's work station using a standard search-engine-type GUI or other user interface. The query could comprise: free-text queries searching for desired words or phrases contained in all crawled assets; "attribute-specific" queries searching for a semantic element that is specific to a source type; or a combination of both free-text and attribute-specific queries. Performing the attribute-specific queries is possible because of the semantic information that is captured in accordance with the present invention.

The query is input to the QR search server 334 of central server 330 where the query is processed in a known manner (e.g., the QR search server translates the user's request into an SQL query that is executed against the database server) and then the parameters defined in the query are searched for in DI server 340. The results of the application of the query on the DI server 340 are ranked according to the relevance of the searched keyword in the free-text attribute and sent back to the QR search server, which are then communicated to the requesting Team member.

Figure 4:
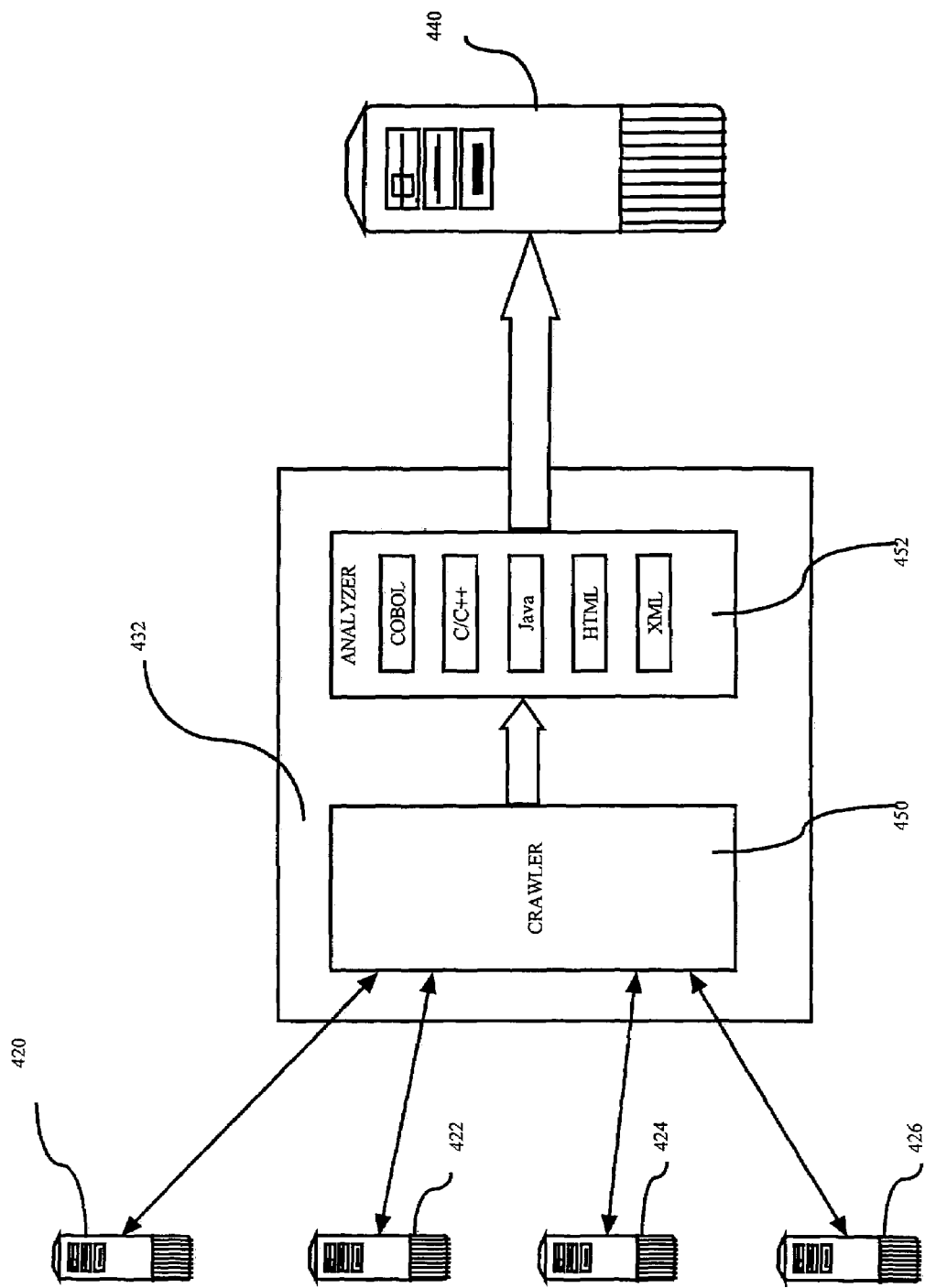
FIG. 4 is a block diagram illustrating the ALGO server illustrated in FIG. 3.

FIG. 4 is a block diagram illustrating the ALGO server 332 of FIG. 3. As shown in FIG. 4, an ALGO server 432 comprises a crawler 450 and an analyzer 452. Analyzer 452 includes language-specific analyzers 454 (COBOL), 456 (C++), 458 (Java), 460 (HTML), and 462 (XML). Crawler 450 is coupled via a two-way communication path to Team servers 420, 422, 424 and 426. A one-way data connection is formed between crawler 450 and analyzer 452. Analyzer 452 is coupled via a one-way communication path to database and index server 340.

In operation, the crawler 450 is invoked to read the software assets stored in the Team servers 420, 422, 424, and 426. In a preferred embodiment, crawler 450 includes a scheduler so that the crawling process can take place during off-hours when the use of the computer resources is minimal. For example, the scheduler can invoke the crawler to perform a crawl over the Team servers. The crawling is performed recursively starting at crawling "roots" (starting points) which are predefined by the user. These roots are starting-point locations on the Team servers from which the crawler begins the crawl process. The crawler, for every file accessed, determines if there is a suitable analyzer for that file type (this determination is based on configurable resource mapping). If there is not a suitable analyzer, the crawler continues to the next asset. If there is a suitable analyzer for the next asset, the crawler first checks against the database to see if the asset is new or has changed. If the crawler determines that the asset needs to be analyzed (i.e., if it is new or has changed), it invokes the analyzer against the resource to capture and store the relevant information in the database. The crawler performs these steps for all domains or crawl roots specified in the configuration. The data read by crawler 450 from the Team servers is sent to analyzer 452.

The analyzers are responsible for parsing the software assets read by crawler 450. In the example analyzer 452 shown in FIG. 4, COBOL files are analyzed by COBOL analyzer 454, C++ files are analyzed by C++ analyzer 456, Java files are analyzed by Java analyzer 458, HTML files are analyzed by HTML analyzer 460, and XML files are analyzed by XML analyzer 462. The analyzers extract the filepath name and the last update time and date for each software asset. In addition, each analyzer constructs a free-text attribute based on resource comments and other textual information as well as semantic information which varies by source type. Since the analyzers are preprogrammed to search for semantics specific to an asset type, no user input is required for the semantic analysis, simplifying the search process and assuring uniformity in the search itself.

As an example, presume that crawler 450 encounters a C/C++ software asset. The asset is read by crawler 450 and passed on to analyzer 452 where it is parsed, and the C/C++ analyzer 456 is invoked. C/C++ analyzer 456 is configured to capture C/C++-specific information, including the filepath, free-text constructed out of: all types of comments, class name, base class names, method names, and class member variable names; class names; base classes; class member variables; class methods; "include" files; templates; and last update date/time. This information is extracted and delivered to DI server 440 where, in a known manner, all attributes are gathered into a single record which is written to a relational database. The free-text attributes are additionally indexed by the index server to support free-text searches. The database contains a separate database table for each asset type. Each database table contains the attributes that represent the textual and semantic information for the asset. The result is an enhanced data set which is searchable as described below to mine the desired information.

Figure 5:
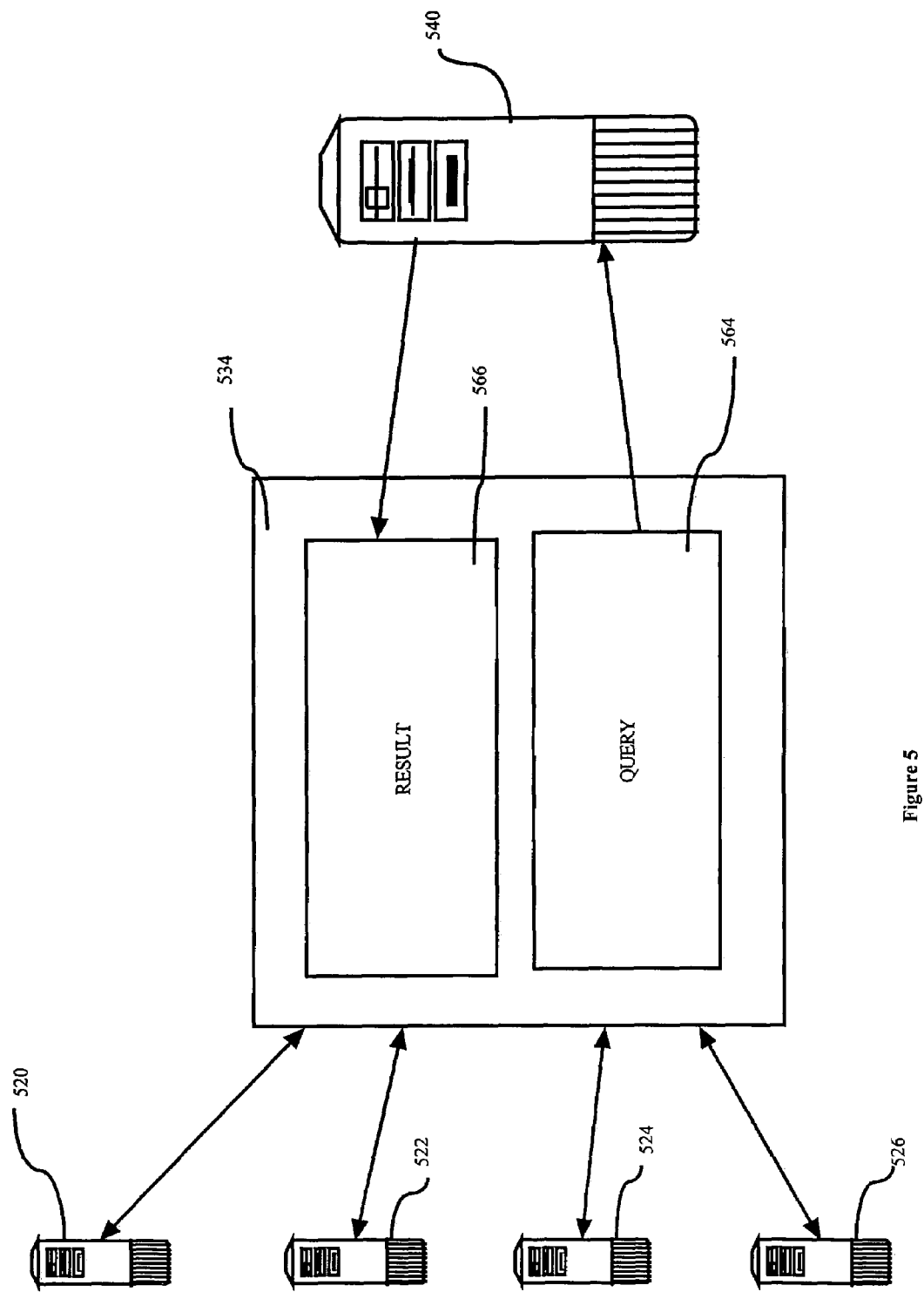
FIG. 5 is a block diagram illustrating the QR Search server illustrated in FIG. 3.

FIG. 5 is a block diagram illustrating the QR Search server shown in FIG. 3. In FIG. 5, the QR Search server 534 is subdivided into two elements, a Query server 564 and a Result server 566. The QR Search server 534 is coupled to DI server 540 and Team servers 520, 522, 524, and 526 so that two-way data communication can be achieved between the devices as shown. Once the Team server repositories have been crawled and the asset data captured and stored in DI server 540 as described above, queries can be performed. The QR Search server 534 performs the function of receiving the queries from the Team servers and interacting with the DI server 534 to return the appropriate results based on the queries. The QR Search server can be programmed to return the results to the Team servers in, for example, HTML (e.g., to be displayed on a browser) or as an XML stream.

As an example, the Team servers can be equipped with a user interface that allows users to specify queries of varying complexity and generate an HTTP request to cause the QR Search server 534 to run the search. The search is then run using conventional search operations to search the enhanced data files stored in the DI server 540. The results of the search are then returned to the requesting Team server in an XML stream which is parsed by the user interface and formatted for presentation to the user in a known manner. The user then can perform library management actions against the results including, for example, viewing the contents of the listed files, extracting information form the listed files and/or "checking out" the asset(s) for use.

Use of the present invention provides the user with many advantages not available to users of prior art asset management systems. For example, users of the present invention can quickly identify components of assets that are candidates for re-use and, if desired, which assets currently (e.g., on a specific date) may contain such components.

Consider an example of a hypothetical software development department of a major corporation in which a particular Project X is being developed, some of which is being developed using Java. Java has a characteristic allowing packaging so that groups of related Java assets are grouped together. Presume that one of the development packages of Project X is stored in file named "com.corp.ProjectX.reuse", and that this development package is used to group Java classes that are re-usable. This package includes, for example, a notebook control, toolbar control, button classes, etc.

Using the present invention, both (a) free-text queries against all assets sources and (b) attribute specific queries for all assets of a particular language can be performed. For Java sources, one of the attributes that can be searched is the attribute "package name." Thus, using the present invention, a search against all Java sources with the package name "com.corp.ProjectX.reuse*" will retrieve a listing of all Java sources included in that package (as is well known, the "*" character is a "wild card" character). This simple query retrieves all Java classes intended for re-use.

It also may be desirable to know who is currently using these re-usable components (e.g., today, within the last week, etc) so that a better understanding can be gained of how others have been able to use these classes. In Java, a package is used by specifying an "import statement" in any Java asset that will use classes from that package (e.g., "import com.corp.ProjectX.reuse"). Using the present invention it is possible to search all Java sources based on the "import" attribute. To retrieve all Java assets that import the package "com.corp.ProjectX.reuse," using the present invention, a query which specifies a search of Java assets for the attribute "import" and the package name "com.corp.ProjectX.reuse.*" will yield the desired result.

Of course, development groups will have their unique conventions for identifying reusable components. Since the present invention supports free-text queries that are very similar to familiar search engines, there is a great deal of flexibility to allow support of a wide range of conventions.

Another key use of the present invention relates to impact analysis, which is the ability to determine the impact a change will make on the many assets contained in an asset library. A classic example of such a change that caused a major impact in the Java programming community was when Sun Microsystems decided to change all their Java user interface package names from "com.sun.java.swing.*" to "javax.swing.*." This change required all code currently using these Java packages to change to use the new package name "javax.swing." With the present invention, it can quickly be determined which library assets will be affected by such a change by specifying a query against all Java sources that import package "com.sun.java.swing*."

Although the present invention has been described with respect to a specific preferred embodiment thereof, various changes and modifications may be suggested to one skilled in the art and it is intended that the present invention encompass such changes and modifications as fall within the scope of the appended claims. For example, while the three main components of the present invention (the ALGO server, the QR Search server, and the DI server) are illustrated and described as comprising three separate servers, these elements can all reside on the same physical server or on different servers as appropriate. Likewise, while the Team servers are illustrated as being individual server elements, they may also be contained in a single physical server, even in the same physical server as comprising the three main components of the present invention. Further, the search queries can be input from an outside source unrelated to the repository servers, e.g., from a terminal connected to the QR server v via the Internet.

In addition, the present invention is not limited to functioning with only the languages specified herein, and it is understood that the present invention provides a framework for allowing users to add user-defined analyzers and crawlers as plug-ins, and that the set of analyzers implemented by a user can be customized to include user-specific information (e.g., customized code metrics based on a specific development environment). Further, while the examples given above focus on the use of the present invention in a software development setting involving mining of software and code assets, the present invention can support any asset type, for example, non-programming language files such as word processing text document (e.g., WordPerfect or MSWord documents), binary image files (e.g., GIF's or JPG's), sound files (e.g., MP3 or MPEG's) and the like. As an example, the present invention could be used to analyze sound files stored in repositories. Different semantics for each sound file could be extracted, for example, sound type (music/lyrics/speech/noise/other), sound-gender (male/female), and sound-words (words identified in the sound file). This would allow the construction of a sound library enabling users to find, for example, songs sung by male artists having lyrics which contain the words "love" and "hate."

We claim:

1. A computer-implemented method for locating code assets of diverse types stored on a storage device for indexing, comprising the steps of:
    performing a crawl process on said storage device to identify stored assets;
    identifying the asset type of, and asset-specific parameters related to, said stored assets, said asset-specific parameters comprising languages in which each code asset is written;
    analyzing said stored assets based on said identified asset-specific parameters;
    extracting textual and semantic information from said stored assets, said semantic information including semantic information specific to the asset type of each stored asset; and
    storing and indexing said extracted textual and semantic information for retrieval.

2. The method as described in claim 1, wherein said analysis step is performed using language-specific analyzers corresponding to the languages of said code assets.

3. The method as described in claim 2, wherein said language-specific analyzers analyze said stored assets based on predetermined parameters specific to the language to which they correspond.

4. A locating system for locating assets stored on a storage device for indexing, comprising:
    crawling means for reading the contents of said storage device to identify stored assets;
    analyzing means for identifying asset-specific parameters related to said stored assets, analyzing said stored assets based on said identified asset-specific parameters, and extracting textual and semantic information from said stored assets based on said analysis; and
    storing and indexing means for storing and indexing said extracted textual and semantic information for retrieval, wherein said stored assets comprise assets of diverse types and wherein said analyzing means comprises an analysis server connected between said crawling means and said storing and indexing means, said analysis server including one or more asset-type specific servers, with at least one of said asset types having a corresponding asset-type specific analyzer and wherein said stored assets comprise code assets and wherein said asset-specific parameters comprise languages in which each code asset is written.

5. The system as set forth in claim 4, further comprising:
    locating means for locating stored assets by applying a search query to said semantic information stored in said storing and indexing means.

6. The system as set forth in claim 5, wherein said locating means includes means for applying a search query to said textual information stored in said storing and indexing means.

7. The system as set forth in claim 6, wherein said locating means includes means for applying a search query to both said semantic information and said textual information simultaneously.

8. The system as set forth in claim 4, wherein a plurality of said asset types have a corresponding asset-type specific analyzer.

9. The system as set forth in claim 8, wherein each of said asset types has a corresponding asset-type specific analyzer.

10. The system as set forth in claim 4, wherein said asset-type specific analyzer extracts predefined semantic information specific to the asset type to which it corresponds.

11. The system as described in claim 4, wherein said analysis step is performed using language-specific analyzers corresponding to the languages of said code assets.

12. The system as described in claim 11, wherein said language-specific analyzers analyze said stored assets based on predetermined parameters specific to the language to which they correspond.

* * * * *